(12) United States Patent
Genin et al.

(10) Patent No.: US 7,834,590 B2
(45) Date of Patent: Nov. 16, 2010

(54) ELECTRONIC SYSTEM FOR A BATTERY

(75) Inventors: Philippe Genin, Bordeaux (FR);
Christophe Morin, Beruges (FR)

(73) Assignee: Saft Groupe SA, Bagnolet (FR)

( * ) Notice: Subject to any disclaimer, the term of this patent is extended or adjusted under 35 U.S.C. 154(b) by 33 days.

(21) Appl. No.: 11/763,017

(22) Filed: Jun. 14, 2007

(65) Prior Publication Data

US 2008/0290837 A1 Nov. 27, 2008

(30) Foreign Application Priority Data

May 25, 2007 (FR) .................................. 07 03713

(51) Int. Cl.
*H02J 7/00* (2006.01)
(52) U.S. Cl. ...................... 320/136; 320/128
(58) Field of Classification Search ......... 320/134–136, 320/116, 128
See application file for complete search history.

(56) References Cited

U.S. PATENT DOCUMENTS

| | | | |
|---|---|---|---|
| 5,256,955 A * | 10/1993 | Tomura et al. .............. 320/110 |
| 5,689,172 A | 11/1997 | Koyama et al. | |
| 6,621,249 B2 * | 9/2003 | Inoue .......................... 320/135 |
| 7,414,382 B2 * | 8/2008 | Liscio et al. ................. 320/127 |
| 2005/0046391 A1 * | 3/2005 | Veselic et al. ............... 320/133 |
| 2008/0211309 A1 * | 9/2008 | Nolte ........................... 307/66 |

FOREIGN PATENT DOCUMENTS

| | | |
|---|---|---|
| EP | 1 494 332 A2 | 1/2005 |
| EP | 1 521 344 A1 | 4/2005 |
| GB | 2 292 051 A | 2/1996 |

* cited by examiner

*Primary Examiner*—Edward Tso
*Assistant Examiner*—Ramy Ramadan
(74) *Attorney, Agent, or Firm*—Sughrue Mion, PLLC

(57) ABSTRACT

An electronic system for a battery comprises a charging circuit (20) for the battery connected to a connector powering the charging circuit (15), a control and monitoring circuit (30) for the operation of the battery, and a discharge circuit connected to power connectors (2) of the battery. The control and monitoring circuit (30) interrupts battery charging when there is a call for current via the power connectors (2) of the battery. The electronic system has application to rechargeable batteries used to provide back up power.

13 Claims, 2 Drawing Sheets

ELECTRONIC SYSTEM FOR A BATTERY

BACKGROUND OF THE INVENTION

The present invention relates to an electronic system for a battery comprising at least one sealed accumulator.

An electrochemical cell or accumulator (these terms are equivalent) is a device for producing electricity in which chemical energy is converted into electrical energy. The chemical energy is constituted by electrochemically active compounds deposited on at least one side of electrodes arranged inside the accumulator. Electrical energy is produced by electrochemical reactions while the accumulator is discharging. The electrodes, arranged inside a container, are electrically connected to current output terminals providing electrical continuity between the electrodes and an electrical consumer with which the accumulator is associated.

The battery is designed to supply electrical energy to an external application; a charging circuit is consequently generally provided to which the battery can be connected in order to recharge the accumulators. In order to increase output power, it is known to associate several sealed accumulators in order to form a battery. The battery then comprises one or several parallel branches of accumulators connected in series. Charge and discharge management of the battery can then be arranged and monitored in order to balance charge and discharge of the various accumulators one with respect to the others. A control and monitoring circuit, which is more or less elaborate depending on applications, is generally provided in order to be associated with the battery.

For applications in which batteries are used for emergency purposes, it is important that the accumulators be charged to their full capacity prior to their use, which can occur at any point in time. Now, batteries are generally connected to a charger and then disconnected from the charger in order to be connected to the application for which they are intended. Thus, a battery providing back up power can be partially discharged when demands are made on it. In an application to aircraft, and in particular to drones, it is desirable for the emergency battery to be operational at its full capacity when needs arise.

Further, it is desirable that the battery providing back up power can supply electrical power to the application for which it is designed speedily and reliably when the source of main power supply to the application fails for some reason.

SUMMARY OF THE INVENTION

There is consequently a need for a battery providing back up power which can be charged permanently as long as demands are not being made on it by the external application, and which can supply electrical energy in a reliable fashion and immediately when demands are placed on it.

To this end, the invention provides an electronic system for a battery which comprises a charging circuit that is independent of the circuit discharging the battery. There is no switch causing the electronic system to switch over from charging status to discharge status. Reliability and rapidity of current supply by the battery providing back up power are consequently improved. The charging circuit is connected to a connector powering the charging circuit that is separate from the power connectors of the battery. The battery can consequently be permanently charged, wherever it is located. Notably, the external application can charge the back up power battery as long as the main power supply is operational.

More particularly, the invention provides an electronic system for a battery comprising:

a charging circuit for the battery connected to a connector powering the charging circuit;
a control and monitoring circuit for the operation of the battery;
a discharge circuit connected to power connectors of the battery;
the control and monitoring circuit interrupting battery charging when there is a call for current via the power connectors of the battery.

According to embodiments, the electronic system according to the invention can further comprise one or several of the following characteristics:

the charging circuit and the control and monitoring circuit are integrated into a same printed circuit board;
the control and monitoring circuit regulates charging of each accumulator of the battery as long as there is no call for current via the power connectors of the battery;
the control and monitoring circuit receives data originating from sensors arranged in the battery;
the control and monitoring circuit controls heating elements arranged in the battery.
the connector powering the charging circuit for the battery further comprises a connector to a data bus.

The invention further provides a battery providing back up power comprising:

at least one sealed electrochemical accumulator placed in a container;
power connectors intended to supply an external application with current;
an interface connector with the external application;
an electronic system according to the invention, the interface connector providing powering of the battery charging circuit.

According to one embodiment, the interface connector provides transfer of data between the control and monitoring circuit of the battery and the external application.

According to one embodiment, the electronic system and the interlace connector are integrated into a same package fixed to the container.

The invention has application to the use of such a battery providing back up power in an aircraft, for example a drone.

Further characteristics and advantages of the invention will become more clear from the description which follows, provided by way of example and with reference to the attached drawings.

DETAILED DESCRIPTION OF PREFERRED EMBODIMENTS

The invention applies to a battery providing back up power, in other words a battery designed to supply electrical energy to an external application should the main power supply fail for any reason. The invention provides an electronic system with a charging circuit that is independent of the battery discharge circuit. The charging circuit is connected to an electrical connector powering the charging circuit which is separate from the battery power connectors by means of which the battery supplies electrical energy to an external application. The battery providing back up power according to the invention can thus be charged permanently to full capacity, from a fixed power supply or from the main power supply of the application, as long as demands are not being made on it by its back up power function. A particular application of such a battery providing back up power can be envisaged for aircraft and notably for long-range drones which require considerable capacity; the battery providing back up power can be charged by a power supply on the ground or by the main power supply of the aircraft as long as the latter is operational and can supply electrical energy to the aircraft as soon as necessary, without switching over of electrical connections.

Figure 1:
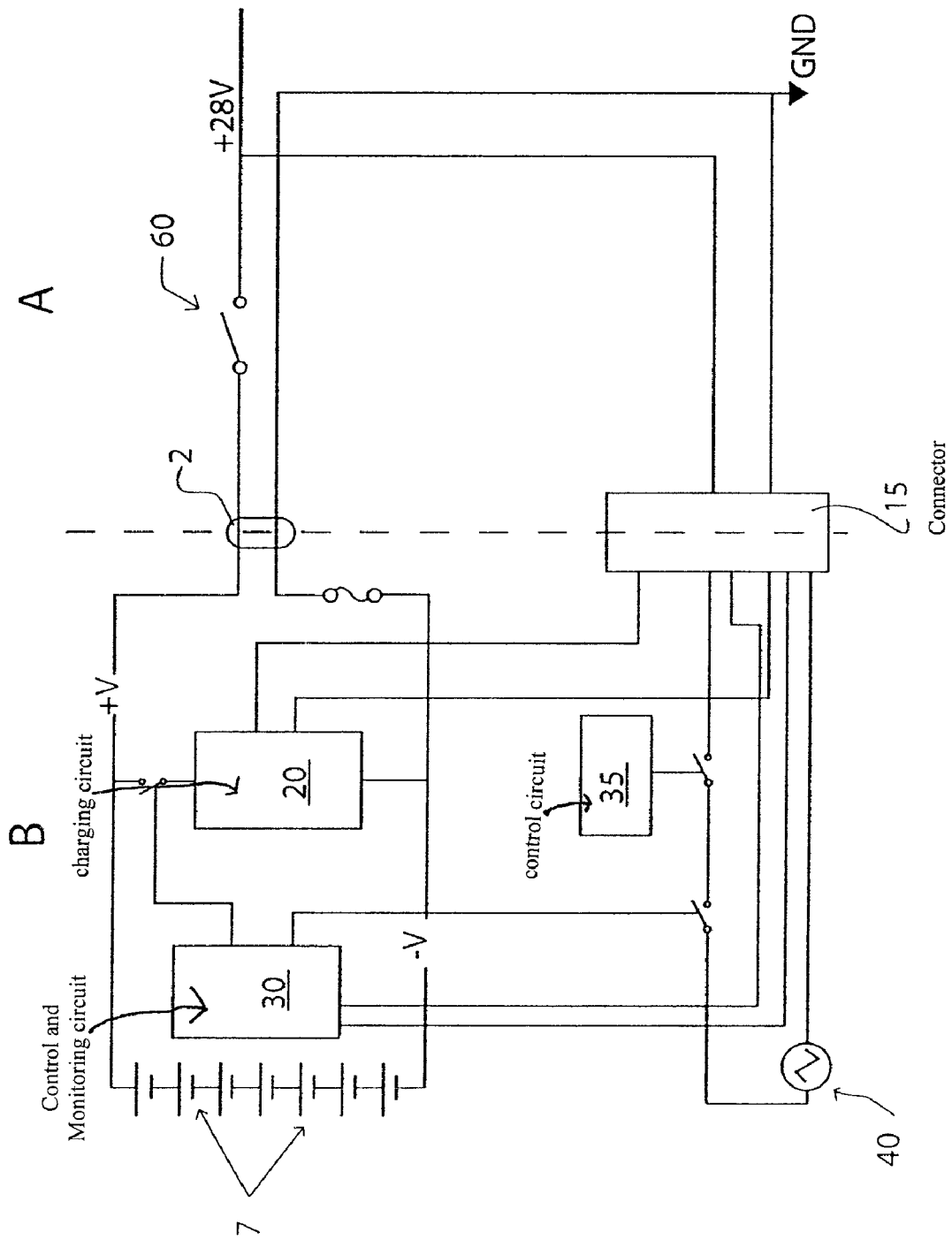
FIG. 1 is a diagrammatic view of the electronic system of the invention.

FIG. 1 is a simplified circuit diagram of the electronic system of the invention. A vertical dashed line separates, diagrammatically, the electric lines of the battery (Side B) from the electric lines of the application (side A).

The battery comprises at least one sealed accumulator; on FIG. 1, a branch of seven accumulators 7 in series is shown, but it will be understood that several parallel branches of accumulators in series can be provided. A control and monitoring circuit 30 supervises operation of the battery in order to balance charging and discharge of the accumulators 1 with respect to the others. Such a control and monitoring circuit 30 receives information originating from sensors arranged in the battery, for example information on voltage, current and temperature of each accumulator 7. The accumulators 7 have +Ve and −Ve current output terminals connected to the power connectors 2. The battery can thus supply electrical energy to the external application via its power connectors 2. A discharge circuit for the battery is thus made up of the +Ve and −Ve electrical links between the current output terminals of the electrochemical accumulators 7 and the power connectors 2 of the battery.

The electronic system of the invention also comprises a charging circuit 20 which is connected to a connector powering the charging circuit 15 that is separate from the power connectors 2 of the battery. Charging circuit 20 can be integrated onto a same printed circuit board as control and monitoring circuit 30, or constitute a separate circuit; charging circuit 20 is however integrated into the battery which can thus be charged permanently wherever it is located.

Connector 15 powering the charging circuit constitutes an interface between the battery and the external application; it comprises a power connector to allow passage of charging current and it can also provide a data connector for a connection to an external data bus. As long as the main power supply of the application, for example a drone, is operational, this interface connector 15 will ensure passage of current from the main power supply (+28V, GND) to charging circuit 20. Charging of the back up power battery is thus permanently ensured as long as the main power supply of the application is operational and the battery can thus be available at full capacity when needed to provide back up power.

Control and monitoring circuit 30 controls charging circuit 20. Notably, control and monitoring circuit 30 regulates charging of each accumulator 7, and avoids any overcharging of the battery. In effect, as charging circuit 20 is permanently connected to the connector 15 powering the charging circuit and consequently receives in continuous fashion an electric current originating from the main power supply of the application, it is the responsibility of control and monitoring circuit 30 to interrupt battery charging. This interruption of charging is not controlled by the application but rather by the battery itself, for example via a safety power transistor of the MOS type, which opens the electrical link between charging circuit 20 and a terminal of the branch of accumulators 7.

Further, interface connector 15 can also allow exchange of information between the battery and the external application in addition to passage of current. The information exchanged can comprise information from the sensors transmitted to control and monitoring circuit 30 of the battery and which is also transmitted to an electronic unit of the application via interface connector 15; this information can also consist in information already processed by control and monitoring circuit 30 of the battery, such as accumulator charge status, operating status of alarms, or other information. Information exchanged can also comprise information concerning the application itself, such as measurements of temperature, altitude, and voltage in the drone.

The battery can further comprise heating elements 40 which can be arranged between the accumulators of the battery. Control and monitoring circuit 30 controls the power supply to these heating elements 40 which is provided by interface connector 15 and an independent control circuit 35 can be provided, to avoid the elements overheating.

Control and monitoring circuit 30 of the battery can receive, via interface connector 15, information concerning the accumulators of the battery (via the sensors arranged in the battery) and concerning the application itself; it can thus control activation of the heating elements for example if the temperature in the drone is below a given value as a result of altitude. Further, control and monitoring circuit 30 can be parameterized from interface connector 15, in other words can be parameterized by a central unit of the application. The battery providing back up power can thus be specifically parameterized or re-parameterized by the application with which it is associated.

The electronic system according to the invention operates as follows.

As long as the main power supply of the application is operational, a switch 60 located in the circuit of the application prevents current being supplied from the battery providing back up power. For its part however, interface connector 15 provides passage of current from the main power supply of the application to the electronic components for the battery, which notably allows permanent charging of the back up power battery via charging circuit 20. Further, interface connector 15 ensures exchange of data between control and monitoring circuit 30 for the battery and a central unit of the external application.

Should the main power supply fail, switch 60 is activated by the central unit of the application in order to put demand on the battery to provide back up power. Current is then immediately supplied to the application via the discharge circuit of the battery which connects the accumulators 7 to the power connectors 2, without charging circuit 20 being concerned. Control and monitoring circuit 30 will control interruption of battery charging immediately it is informed of current passing through the power connectors 2, but current will have nevertheless already been supplied to the application without delay. For example, current sensors can be placed in power connectors 2 and transmit their measurements to control and monitoring circuit 30. The latter can then control opening of the electrical link between charging circuit 20 and a terminal of the branch of accumulators 7 when there is a call for current via power connectors 2, by the simple closing of switch 60 of the application.

The electronic system of the invention thus ensures that the back up power battery is reliable. The battery providing back up power is in effect charged to its full capacity before demands are made on it and the fact that the charging and discharge circuits are independent allows discharge into the application without switching over from one circuit to the other, which can be a source of failure. The back up power battery can notably start discharging even before charging is interrupted, so that the application will not be exposed to any deterioration.

According to one embodiment, the control and monitoring circuit for the back up power battery can be backed up by a control and monitoring circuit situated in the application for which the battery is intended. Thus, if the control and monitoring circuit of the battery were to become faulty, the circuit in the application can back up the control and monitoring circuit, by exchanging all the data and commands needed, via interface connector 15.

Figure 2:
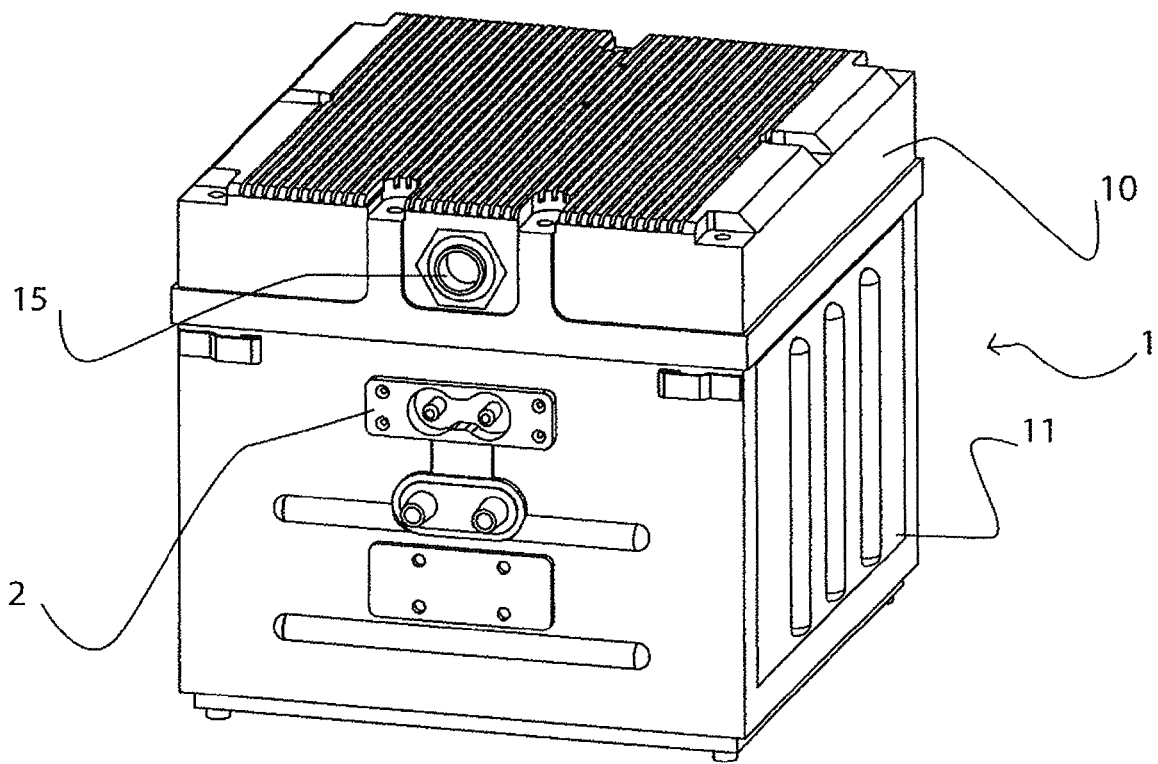
FIG. 2 is a perspective view of the battery associated with an electronic system according to the invention.

FIG. 2 shows an example of a battery 1 according to the invention.

FIG. 2 shows a container 11 with a package 10 on top, the latter integrating the electronic system according to the invention. The power connectors 2 are arranged on a side wall of container 11, separate from the interface connector 15 integrated into the package 10 on the top.

The embodiments described above and the drawings should be considered as being simply illustrative and not restricting, and the invention is not intended to be limited to the details provided here but can be modified while still remaining within the scope of the attached claims. In particular, the invention concerns any type of battery accumulator whether it is prismatic, cylindrical or concentric; or whether it is of the lithium ion, nickel cadmium or nickel metal hydride type.

The invention claimed is:

1. An electronic system for a battery, the system comprising:
   a charging circuit for the battery;
   a connector for powering the charging circuit;
   a control and monitoring circuit for the operation of the battery; and
   a discharge circuit independent of the charging circuit and connected to power connectors of the battery for supplying an external application with current,
   wherein said control and monitoring circuit interrupts battery charging when there is a call for current via the power connectors of the battery without any control from the external application,
   wherein the electronic system is devoid of any switch causing the electronic system to switch over from charging status to discharge status such that discharge starts before charge is interrupted.

2. The electronic system according to claim 1, in which the charging circuit and the control and monitoring circuit are integrated into a same printed circuit board.

3. The electronic system according to claim 1, in which the control and monitoring circuit regulates charging of each accumulator of the battery as long as there is no call for current via the power connectors of the battery.

4. The electronic system according to claim 1, in which the control and monitoring circuit receives data originating from sensors arranged in the battery.

5. The electronic system according to claim 1, in which the connector powering the charging circuit for the battery further comprises a connector to a data bus.

6. A battery providing back up power comprising:
   a) at least one sealed electrochemical accumulator placed in a container;
      power connectors for supplying an external application with current;
      an interface connector with the external application, said interface connector being separate from the power connectors;
   b) an electronic system comprising:
      a charging circuit for the battery connected to the interface connector for powering the charging circuit;
      a control and monitoring circuit for the operation of the battery;
      a discharge circuit independent of the charging circuit and connected to the power connectors of the battery,
   wherein said control and monitoring circuit interrupts battery charging when there is a call for current via the power connectors of the battery without any control from the external application, and
   wherein the electronic system is devoid of any switch causing the electronic system to switch over from charging status to discharge status, such that discharge starts before charge is interrupted.

7. The battery according to claim 6, in which the interface connector provides transfer of data between the control and monitoring circuit of the battery and the external application.

8. The battery according to claim 6, in which the electronic system and the interface connector are integrated into a same package fixed to the container.

9. The use of the battery of claim 6 to provide back up power for an aircraft.

10. The use of the battery of claim 6 to provide back up power for a drone.

11. The battery according to claim 6, further comprising heating elements arranged between the accumulators and powered by the interface connector.

12. The electronic system according to claim 1, in which the control and monitoring circuit controls heating elements arranged in the battery.

13. The electronic system according to claim 2, in which the control and monitoring circuit controls heating elements arranged in the battery.

* * * * *